United States Patent
Heo et al.

(10) Patent No.: US 9,924,169 B2
(45) Date of Patent: Mar. 20, 2018

(54) METHOD AND APPARATUS FOR SELECTING A FILTER BASED ON A VARIANCE OF DEPTH DATA

(71) Applicant: LG Electronics Inc., Seoul (KR)

(72) Inventors: Jin Heo, Seoul (KR); Jiwook Jung, Seoul (KR); Sehoon Yea, Seoul (KR); Moonmo Koo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

(21) Appl. No.: 14/383,357

(22) PCT Filed: Mar. 6, 2013

(86) PCT No.: PCT/KR2013/001806
§ 371 (c)(1),
(2) Date: Sep. 5, 2014

(87) PCT Pub. No.: WO2013/133627
PCT Pub. Date: Sep. 12, 2013

(65) Prior Publication Data
US 2015/0055702 A1 Feb. 26, 2015

Related U.S. Application Data

(60) Provisional application No. 61/607,004, filed on Mar. 6, 2012.

(51) Int. Cl.
*H04N 7/12* (2006.01)
*H04N 19/117* (2014.01)
(Continued)

(52) U.S. Cl.
CPC ......... *H04N 19/117* (2014.11); *H04N 19/136* (2014.11); *H04N 19/82* (2014.11); *H04N 21/816* (2013.01)

(58) Field of Classification Search
CPC .... H04N 19/117; H04N 19/136; H04N 19/82; H04N 21/816
(Continued)

(56) References Cited

U.S. PATENT DOCUMENTS 9,008,175 B2 * 4/2015 Van Der Auwera . H04N 19/176
375/240.12
9,270,871 B2 * 2/2016 Pahalawatta ............. H04N 5/21
(Continued)

FOREIGN PATENT DOCUMENTS

| KR | 10-0954281 | 4/2010 |
|---|---|---|
| KR | 10-2010-0109459 | 10/2010 |

(Continued)

OTHER PUBLICATIONS

International Search Report from PCT/KR2013/001806, dated Jun. 26, 2013.
(Continued)

*Primary Examiner* — Jessica M Prince
(74) *Attorney, Agent, or Firm* — Dentons US LLP

(57) ABSTRACT

According to the present invention, a method of processing a video signal includes the steps of: receiving the depth data corresponding to a given block containing present pixels; determining a variation of the depth data; comparing the variation of the depth data with a predetermined value; if the variation is less than the predetermined value, coding the present pixels by using a first partial filter, and if the variation is greater than the predetermined value, coding the present pixels by using a second partial filter; wherein the second partial filter is applied to a wider range than the first
(Continued)

partial filter. Accordingly the image quality of improved; the complexity according to the filter application is reduced; and at the same time variable filtering may improve the coding efficiency.

6 Claims, 12 Drawing Sheets

(51) Int. Cl.
*H04N 21/81* (2011.01)
*H04N 19/136* (2014.01)
*H04N 19/82* (2014.01)

(58) Field of Classification Search
USPC .................................................. 375/240.12
See application file for complete search history.

(56) References Cited

U.S. PATENT DOCUMENTS

| | | | | |
|---|---|---|---|---|
| 2002/0159648 | A1* | 10/2002 | Alderson | G06T 5/20 382/260 |
| 2008/0170800 | A1* | 7/2008 | Bergman | G06K 9/40 382/275 |
| 2011/0254921 | A1* | 10/2011 | Pahalawatta | H04N 13/0029 348/43 |
| 2012/0162525 | A1* | 6/2012 | Schoner | H04N 19/86 348/607 |
| 2013/0194505 | A1* | 8/2013 | Pahalawatta | H04N 5/21 348/607 |
| 2013/0202194 | A1* | 8/2013 | Graziosi | G06T 3/403 382/154 |

FOREIGN PATENT DOCUMENTS

| | | |
|---|---|---|
| KR | 10-2012-0003147 | 1/2012 |
| WO | 2011-046617 | 4/2011 |

OTHER PUBLICATIONS

Written Opinion of the ISA from PCT/KR2013/001806, dated Jun. 26, 2013.
D3: Lim, Il Soon et al., "Region-Based Adaptive Bilateral Filter in Depth Map Coding." 2011 18th International Conference on Image Processing. pafes 121-124.

* cited by examiner (a)                    (b)

(a)

(b)

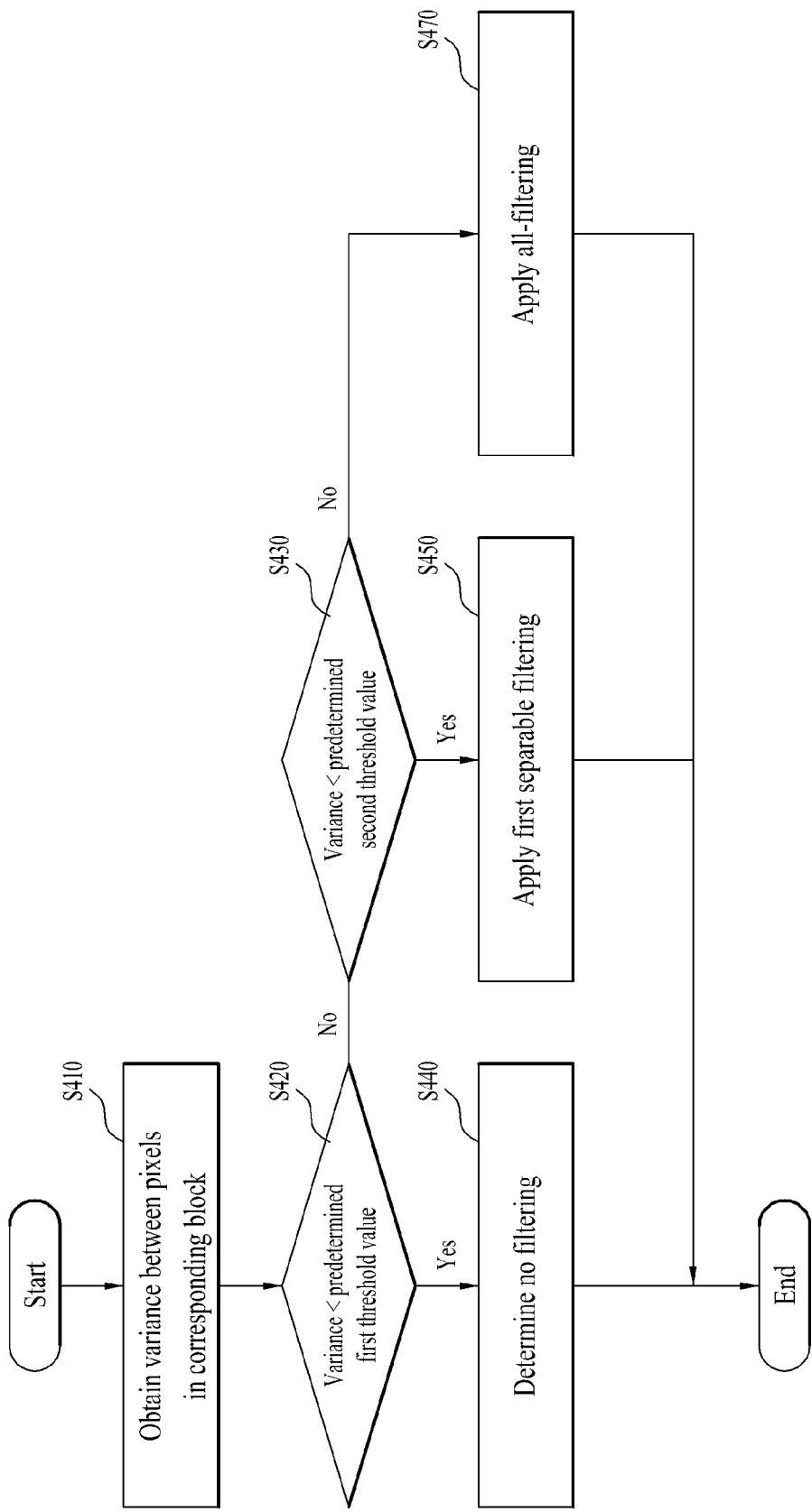

(a)

(b)

(c)

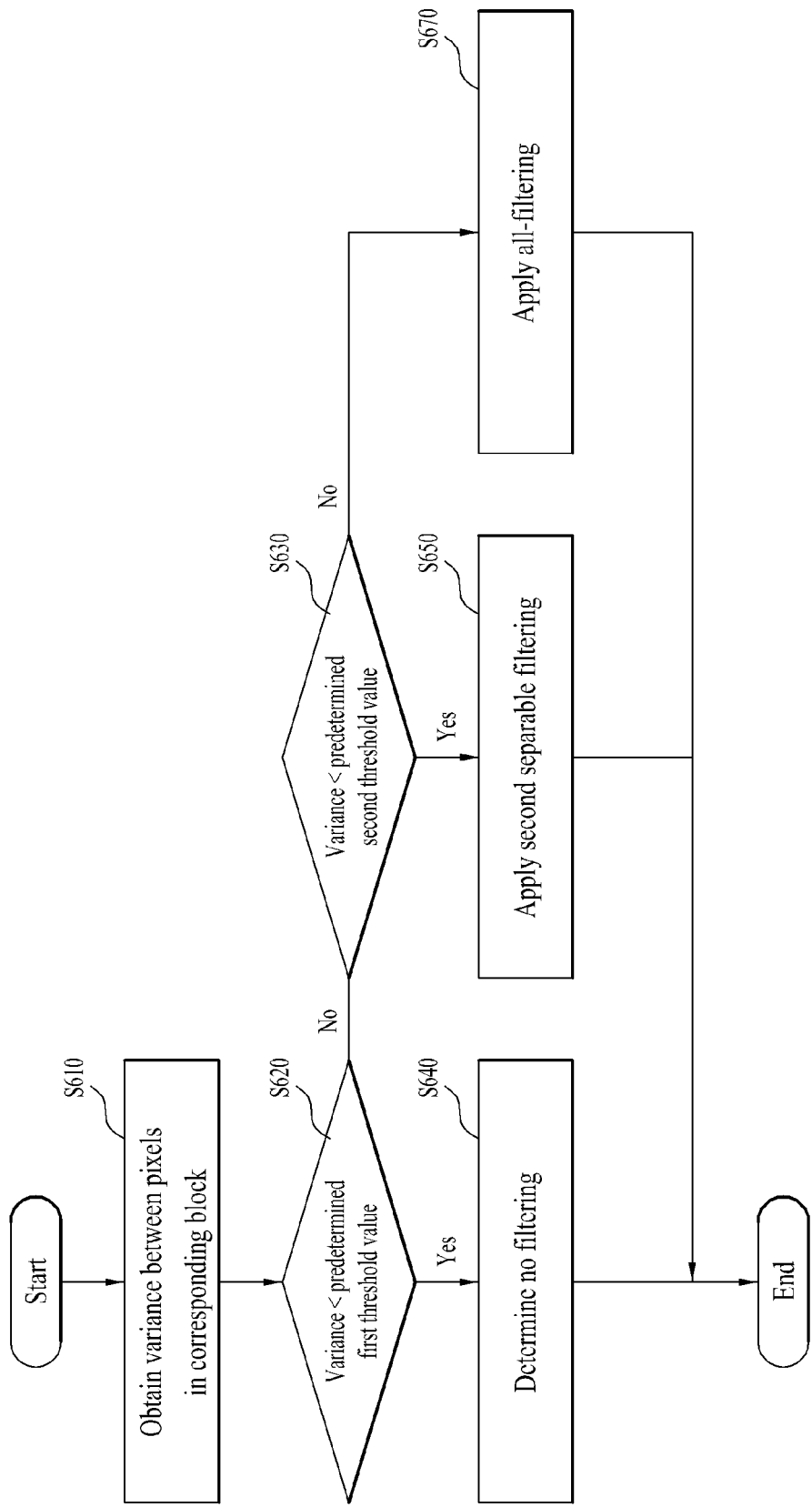

METHOD AND APPARATUS FOR SELECTING A FILTER BASED ON A VARIANCE OF DEPTH DATA

This application is a 35 USC § 371 National Stage entry of International Application No. PCT/KR2013/001806 filed on Mar. 6, 2013, which claims priority to U.S. Provisional Application No. 61/607,004 filed on Mar. 6, 2012, each of which is hereby incorporated by reference in its entirety.

TECHNICAL FIELD

The present invention relates to a method and apparatus for coding video signals.

BACKGROUND ART

Compression refers to a signal processing technique for transmitting digital information through a communication line or storing digital information in a form suitable for a storage medium. Compression targets include audio, video, text, etc. Particularly, a technique for compressing images is referred to as video compression. Multiview video has characteristics of spatial redundancy, temporal redundancy and inter-view redundancy.

DISCLOSURE

Technical Problem

An object of the present invention is to improve a video signal coding efficiency.

Technical Solution

The present invention uses an in-loop filter for depth data separately from texture data.

The present invention uses a region-based adaptive loop filter to reduce block distortion of depth data.

The present invention varies a kernel size of the region-based adaptive loop filter according to a block variance when the region-based adaptive loop filter is used.

The present invention varies the number of pixels to which the region-based adaptive loop filter is applied when the region-based adaptive loop filter is used.

The present invention changes a filter application method according to a block coding mode and a block variance.

Advantageous Effects

The present invention can improve image quality, reduce complexity according to filter application and at the same time increase coding efficiency through variable filtering by applying the region-based adaptive loop filter to depth data.

DESCRIPTION OF DRAWINGS

FIGS. 6A and 6B are flowcharts illustrating methods for determining a filtering application method when the first separable filter is used according to an embodiment to which the present invention is applied;

FIGS. 8A and 8B are flowcharts illustrating methods for determining a filtering application method when the second separable filter is used according to an embodiment to which the present invention is applied.

Best Mode

Figure 1:
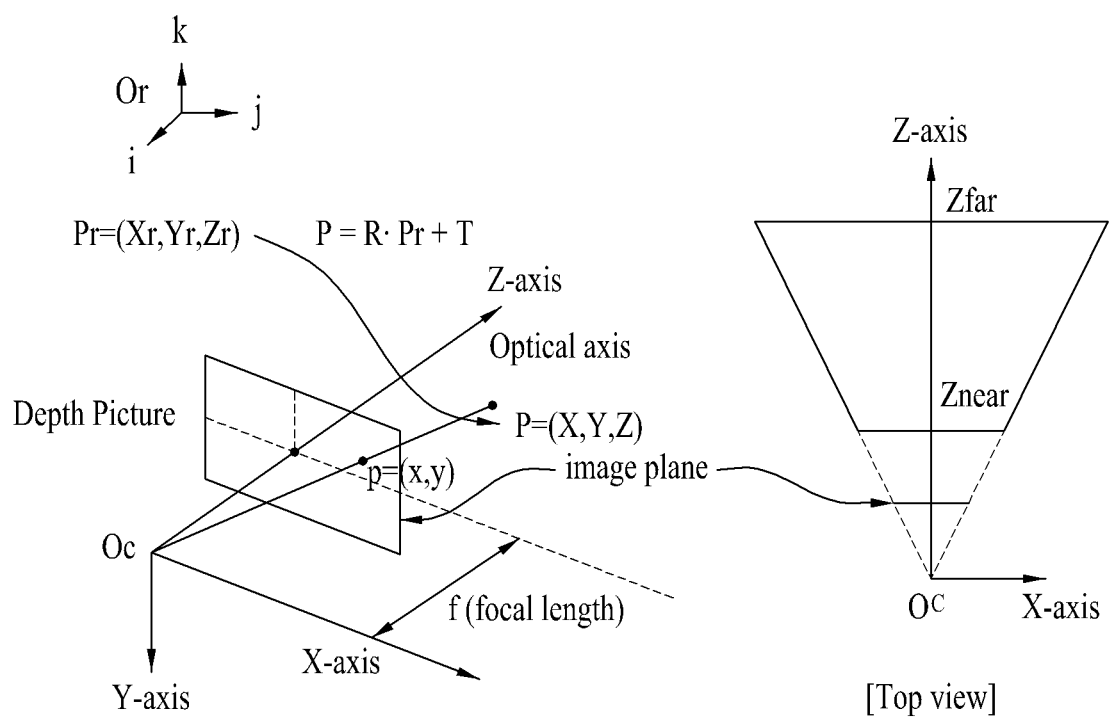
FIG. 1 is a view for explaining the concept of depth according to an embodiment to which the present invention is applied.

To accomplish the object of the present invention, there is provided a method for processing a video signal, including: receiving depth data corresponding to a predetermined block including a current pixel; determining a variance of the depth data; comparing the variance of the depth data with a predetermined value; coding the current pixel using a first separable filter when the variance is less than the predetermined value; and coding the current pixel using a second separable filter when the variance is greater than the predetermined value, wherein the number of pixels used by the second separable filter differs from the number of pixels used by the first separable filter.

The first separable filter may be applied to a predetermined number of pixels located on a horizontal line and a predetermined number of pixels located on a vertical line on the basis of the current pixel in the depth data.

The second separable filter may be applied to a predetermined number of pixels located on a horizontal line, a predetermined number of pixels located on a vertical line and a predetermined number of pixels located in diagonal directions on the basis of the current pixel in the depth data.

A kernel size of the second separable filter may be larger than a kernel size of the first separable filter.

The first separable filter and the second separable filter may correspond to a bilateral filter and the numbers of pixels used by the first separable filter and the second separable filter may be less than the number of pixels used by the bilateral filter.

To accomplish the object of the present invention, there is also provided a method for processing a video signal, including: receiving depth data corresponding to a predetermined block including a current pixel; determining a coding mode of the block; determining a variance of the depth data; comparing the variance of the depth data with a predetermined value; determining a filtering method of the current pixel on the basis of the coding mode and a comparison result; and filtering the current pixel on the basis of the determined filtering method.

The filtering method may include a first method of skipping filtering, a second method of applying a first separable filter, a third method of applying a second separable filter and a fourth method of applying an all-filter, wherein the all-filter uses all pixels corresponding to a kernel size of the corresponding filter, the first separable filter and the second separable filter use only some of all pixels corresponding to the kernel size, and the number of pixels used for the second separable filter is greater than the number of pixels used for the first separable filter.

The all-filter may correspond to a bilateral filter and the first separable filter and the second separable filter may use only some of pixels corresponding to the bilateral filter.

Mode for Invention

A technique for encoding or decoding multiview video signal data considers spatial redundancy, temporal redundancy and inter-view redundancy. In the case of multiview video, it is necessary to code a multiview texture image captured at two or more viewpoints and a multiview depth image corresponding to the multiview texture image in order to generate a 3D image. A depth image can be coded in consideration of spatial redundancy, temporal redundancy or inter-view redundancy. Each sample value of the depth image represents information on a distance between a camera and a corresponding pixel, which will be described in detail below with reference to FIG. 1. In the specification, depth information, depth data, a depth picture, a depth sequence, depth coding, and a depth bitstream may be flexibly interpreted as depth related information. In addition, coding may include both encoding and decoding and may be flexibly interpreted in the technical spirit and technical scope of the present invention.

FIG. 1 is a view for explaining the concept of depth according to an embodiment to which the present invention is applied.

Referring to FIG. 1, a camera position Oc indicates the origin of a camera coordinate system and the Z axis (optical axis) of the camera coordinate system is aligned with a gaze direction of a user. An arbitrary point P=(X, Y, Z) in the camera coordinate system can be projected to a point p=(x, y) on a two-dimensional image plane perpendicular to the X axis. Here, the point p=(x, y) on the two-dimensional image plane can be represented as a texture value or a color value of the point P=(X, Y, Z) of the three-dimensional coordinate system. In this case, the two-dimensional image plane may mean a texture picture. The point p=(x, y) on the two-dimensional image plane can be represented as a Z value of the point P=(X, Y, Z) of the three-dimensional coordinate system. In this case, the two-dimensional image plane may mean a depth picture or a depth map.

While P=(X, Y, Z) of the three-dimensional coordinate system indicates an arbitrary point of the camera coordinate system, a common reference coordinate system for a plurality of cameras may be necessary when the cameras are used. In FIG. 1, an arbitrary point Pw=(Xw, Yw, Zw) of a reference coordinate system having a point Ow as the origin can be converted into a point P=(X, Y, Z) of the camera coordinate system using a 3×3 rotation matrix R and a 3×1 translation vector T. For example, P can be obtained by Equation 1.

$$P = RSPw + T \qquad \text{[Equation 1]}$$

Based on the above description, a depth picture can be defined as a set of information corresponding to relative numerical values of distances between the camera position and an object on the basis of the camera position. Depth information in the depth picture can be obtained from the Z value of three-dimensional coordinates P=(X, Y, Z) on the camera coordinate system, which corresponds to an arbitrary pixel of a texture picture. Here, the Z value belongs to the real number range and may be quantized into a value belonging to the integer range and used as depth information. For example, the depth information can be quantized as represented by Equation 2 or 3.

$$Zq = \text{round}\left(255S \frac{Z - Z_{near}}{Z_{far} - Z_{near}}\right) \qquad \text{[Equation 2]}$$

$$Zq = \text{round}\left(255S \frac{\frac{1}{Z} - \frac{1}{Z_{far}}}{\frac{1}{Z_{near}} - \frac{1}{Z_{far}}}\right) \qquad \text{[Equation 3]}$$

Here, Zq denotes quantized depth information. Referring to the top view of FIG. 1, Znear may represent the lower limit of the Z coordinate value and Zfar may represent the upper limit of the Z coordinate value. The depth information quantized according to Equation 2 or 3 can have an integer value in the range of 0 to 255.

The depth picture may be coded into a sequence along with or separately from a texture image sequence. In this case, various embodiments for compatibility with conventional codecs may be applied. For example, a depth coding technique can be applied as an additional technique for compatibility with the HEVC codec or applied as an extended technique in H.264/AVC multiview video coding.

Figure 2:
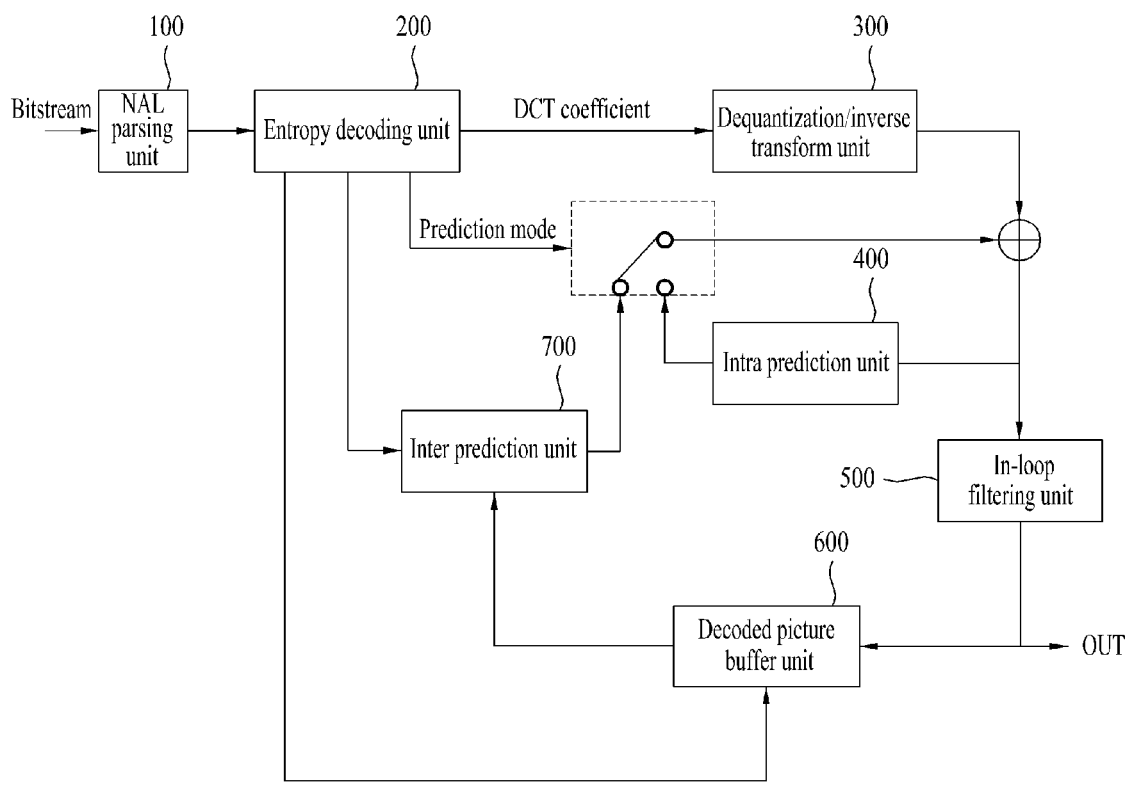
FIG. 2 is a block diagram of a video decoder according to an embodiment to which the present invention is applied.

FIG. 2 is a block diagram of a video decoder according to an embodiment of the present invention.

Referring to FIG. 2, the video decoder may include a parsing unit 100, an entropy decoding unit 200, a dequantization/inverse transform unit 300, an intra prediction unit 400, an in-loop filtering unit 500, a decoded picture buffer unit 600 and an inter prediction unit 700. Texture data and depth data input to the parser may be transmitted through one bitstream or separate bitstreams. The parsing unit 100 may parse an input bitstream in unit of NAL in order to decode the input bitstream. When the input bitstream is multiview related data (e.g. 3-dimensional video), the input bitstream may further include camera parameters. The camera parameters may include an intrinsic camera parameter and an extrinsic camera parameter. The intrinsic camera parameter may include a focal length, an aspect ratio, a principle point, etc. and the extrinsic camera parameter may include camera position information in the global coordinate system.

The entropy decoding unit 200 may extract a quantized transform coefficient, coding information for prediction of a texture picture and a depth picture and the like from the parsed bitstream through entropy decoding. The dequantization/inverse transform unit 300 may apply a quantization parameter to the quantized transform coefficient to obtain a transform coefficient and inversely transform the transform coefficient to reconstitute texture data or depth data. Here, the quantization parameter for a depth block may be set in consideration of complexity of the texture data. For example, when a texture block corresponding to the depth block is a region with high complexity, a low quantization parameter can be set. When the texture block is a region with low complexity, a high quantization parameter can be set. The complexity of the texture block may be determined on the basis of a difference between neighboring pixels in a reconstituted texture picture, as represented by Equation 4.

$$E = \frac{1}{N} Q \sum_{x,y} [CC_{x,y} - C_{x-1,y}C + CC_{x,y} - C_{x-1,y}C]^2 \qquad \text{[Equation 4]}$$

In Equation 4, E denotes data complexity, C represents reconstituted texture data and N represents the number of pixels in a texture data region for which complexity is to be calculated. Referring to Equation 4, the complexity can be calculated using a difference value between texture data corresponding to a point (x, y) and texture data corresponding to a point (x−1, y) and a difference value between the texture data corresponding to the point (x, y) and texture data corresponding to a point (x+1, y). In addition, the complexity can be calculated for the texture picture and texture block, respectively, and a quantization parameter can be derived using the complexity, as represented by Equation 5.

$$\Delta QP = \min\left(\max\left(\alpha \log_2 \frac{E_f}{E_b}, \beta\right), \beta\right) \quad \text{[Equation 5]}$$

Referring to Equation 5, the quantization parameter can be determined on the basis of the ratio of the complexity of the texture picture (texture frame) to the complexity of the texture block. α and β may be variable integers derived in the decoder or predetermined integers in the decoder.

The intra prediction unit 400 may perform intra prediction using the reconstituted depth data of the current depth picture. The in-loop filtering unit 500 may apply an in-loop filter to each coded block in order to reduce block distortion. The in-loop filter improves quality of a decoded image by smoothing the edge of a block. A filtered texture picture or depth picture may be output or stored in the decoded picture buffer unit (600) to be used as a reference picture. Since texture data and depth data have different characteristics, coding efficiency may be deteriorated when the texture data and the depth data are coded using the same in-loop filter. Accordingly, a separate in-loop filter for the depth data needs to be defined. A detailed embodiment of the in-loop filter for the depth filter will be described later.

The decoded picture buffer unit 600 stores or opens previous coded texture pictures or depth pictures for inter prediction. To store or open the previous coded texture pictures or depth pictures, a frame number frame_num and POC (Picture Order Count) of each picture are used. Furthermore, the previous coded pictures include depth pictures at viewpoints different from the viewpoint of the current depth picture in depth coding. To use the depth pictures as reference pictures, viewpoint identification information for identifying a viewpoint of a depth picture may be used. The decoded picture buffer unit 600 may manage reference pictures using an adaptive memory management control operation method, a sliding window method and the like in order to implement inter prediction more flexibly. This is for the purpose of integrating a reference picture memory and a non-reference picture memory into one memory and efficiently managing the memory with small capacity. In depth coding, depth pictures may be marked by a separate indication, to be discriminated from texture pictures in the decoded picture buffer unit 600 and information for identifying each depth picture may be used in the marking process. The reference picture managed through this process may be used for depth coding in the inter prediction unit 700.

The inter prediction unit 700 may perform motion compensation of a current block using the reference pictures and motion information stored in the decoded picture buffer unit 600. In the specification, motion information may be understood as information including a motion vector and reference index information in a broad sense. Motion compensation may be performed using one reference picture in an L0 reference picture list. In addition, motion compensation may be performed using a plurality of reference pictures from an L1 reference picture list as well as the L0 reference picture list.

In the case of a multiview image captured through a plurality of cameras, inter-view disparity caused by a camera position difference may be generated. To compensate for this inter-view disparity, a disparity vector may be used. The disparity vector can be defined as a difference between a position of a target block corresponding to the current viewpoint and a position of a reference block corresponding to a neighboring viewpoint.

A description will be given of embodiments of an in-loop filtering method for efficiently coding depth data. The present invention can improve image quality and adjust the boundary of each block by applying an in-loop filter to a depth picture.

According to a first embodiment of the present invention, the in-loop filtering unit 500 may apply a region-based adaptive loop filter to depth data.

The in-loop filtering unit 500 may determine whether to apply a filter on the basis of a variance of a depth block. The depth block variance is a value used to determine variances of pixel values in the depth block. For example, the depth block variance can be defined as a difference value between a maximum pixel value and a minimum pixel value in the depth block including the current pixel. When the depth block is composed of 8×8 pixels, the number of neighboring pixels including the current pixel is 64 and a variance of the depth block can be a difference between a maximum value and a minimum value from among the 64 pixels. While the depth block variance is defined as a difference value between a maximum pixel value and a minimum pixel value in the present embodiment, the depth block variance can be defined through various methods capable of obtaining a pixel value variance such as the sum of an average of pixels in the depth block and an absolute value of a difference between pixels.

Upon determination of the depth block variance, the in-loop filtering unit 500 may determine whether to apply a filter by comparing the determined depth block variance with a predetermined threshold value. For example, when the depth block variance is greater than or equal to the predetermined threshold value, a difference between the maximum pixel value and the minimum pixel value in the depth block is large and thus a filer can be applied. On the contrary, when the depth block variance is less than the predetermined threshold value, the filer may not be applied. When the filter is applied according to the comparison result, the filter may be a bilateral filter. When the bilateral filter is applied, pixel values of the filtered depth block can be derived by applying a predetermined weight to neighboring pixel values. The predetermined weight may be determined on the basis of a position difference between a currently filtered pixel and a neighboring pixel and/or a difference value between the currently filtered pixel value and the neighboring pixel value. The neighboring pixel value is not the currently filtered pixel value and may be one of pixel values included in the depth block. While an example of application of the bilateral filter to the in-loop filtering unit 500 has been described, any filter that can code depth data, such as a media filter, can be used in the in-loop filtering unit 500.

According to a second embodiment of the present invention, the in-loop filtering unit 500 can apply a trilateral loop filter to depth data.

While the trilateral loop filter according to the present invention is similar to the region-based adaptive loop filter, the trilateral loop filter is distinguished from the region-based adaptive loop filter in that the former additionally considers texture data. Specifically, the trilateral loop filter can extract depth data of a neighboring pixel which satisfies the following three conditions.

$$|p-q| \leq \sigma1 \qquad \text{Condition 1.}$$

$$|D(p)-D(q)| \leq \sigma2 \qquad \text{Condition 2.}$$

$$|V(p)-V(q)| \leq \sigma3 \qquad \text{Condition 3.}$$

Condition 1 compares a position difference between the current pixel p and a neighboring pixel q in the depth block with a predetermined parameter σ1, condition 2 compares a difference between depth data of the current pixel p and depth data of the neighboring pixel q with a predetermined parameter σ2 and condition 3 compares a difference between texture data of the current pixel p and texture data of the neighboring pixel q with a predetermined parameter σ3.

Neighboring pixels that satisfy the three conditions may be extracted and the current pixel p may be filtered using a median or average of depth data of the extracted neighboring pixels.

Figure 3:
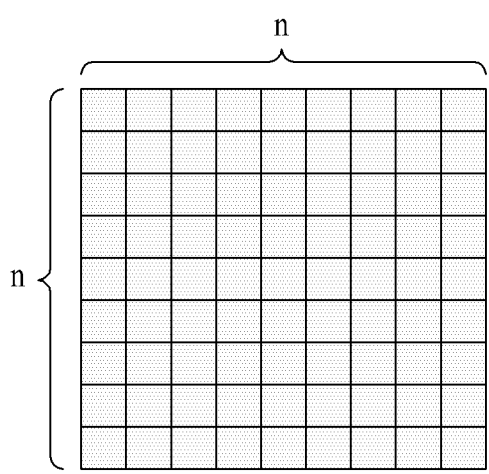
FIGS. 3A and 3B illustrate filter kernel sizes according to an embodiment to which the present invention is applied.
Figure 3:
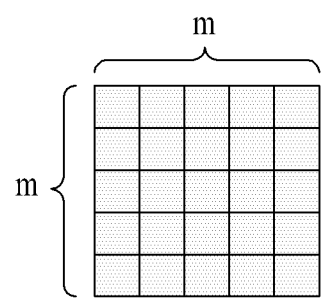

FIGS. 3A and 3B illustrate kernel sizes of a filter applied to depth data according to an embodiment of the present invention.

A large kernel size can highlight edge information and efficiently remove noise but increases complexity. Accordingly, the present invention adjusts a kernel size for filtering on the basis of a depth block variance. That is, a filter kernel size is set to a large value in the case of a large depth block variance, as shown in FIG. 3A, and set to a small value in the case of a small depth block variance, as shown in FIG. 3B. Here, n in FIG. 3A is greater than m in FIG. 3B.

Figure 4A:
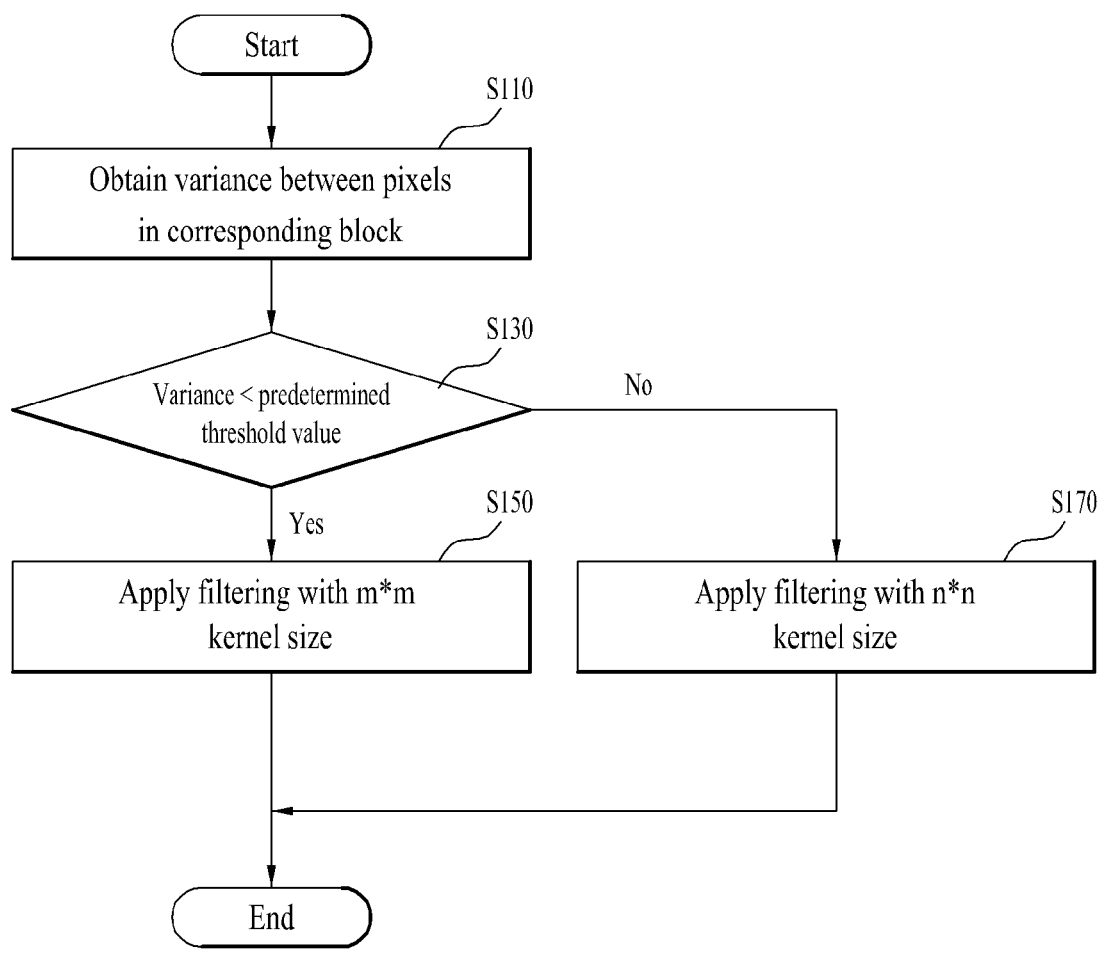
FIGS. 4A and 4B are flowcharts illustrating methods for determining a filtering application method according to an embodiment to which the present invention is applied.

FIG. 4A illustrates a third embodiment of the present invention for controlling a kernel size of a filter applied to depth data.

In the embodiment shown in FIG. 4A, a depth block variance can be obtained in the same method as that described in the first embodiment (S110). The depth block variance is obtained using pixel values in a block including the current pixel (S110) and compares the depth block variance with a predetermined threshold value (S130). When the depth block variance is less than the predetermined threshold value, filtering with a small kernel size is applied (S150). When the depth block variance is not less than the predetermined threshold value, filtering with a large kernel size is applied (S170). Here, filtering with a small kernel size may be applied even when the depth block variance is identical to the predetermined threshold value.

Figure 4B:
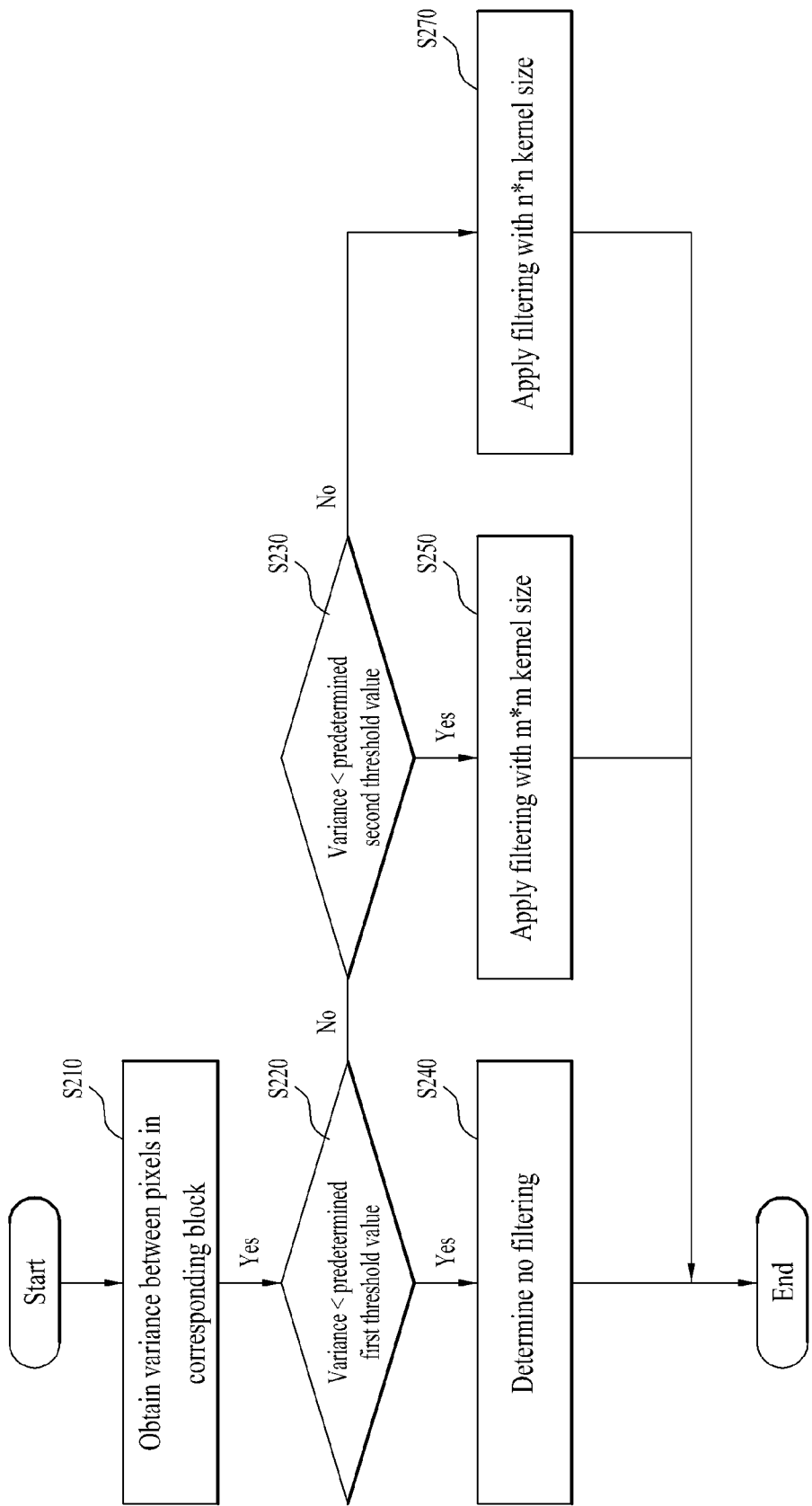

FIG. 4B illustrates a fourth embodiment of the present invention for controlling a kernel size of a filter applied to depth data.

In the embodiment shown in FIG. 4B, a depth block variance can be obtained in the same method as that described in the first embodiment (S210). That is, the depth block variance is obtained using pixel values in a block including the current pixel (S210) and compares the depth block variance with a predetermined first threshold value (S220). When the depth block variance is less than the predetermined first threshold value, filtering is not applied (S240). The depth block variance is compared with a predetermined second threshold value (S203). When the depth block variance is less than the predetermined second threshold value, filtering with a small kernel size is applied (S250). When the depth block variance is not less than the predetermined second threshold value, filtering with a large kernel size is applied (S270).

While the fourth embodiment determines filtering to be applied in the same method as the third embodiment, the fourth embodiment is distinguished from the third embodiment in that the depth block variance is additionally compared with the predetermined first threshold value and whether to apply filtering is determined according to the comparison result.

Figure 5:
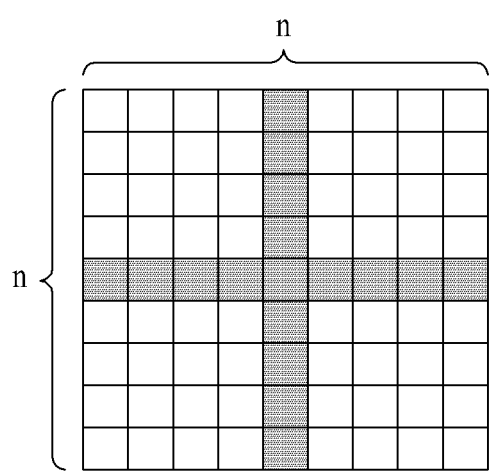
FIGS. 5A and 5B illustrate ranges to which a first separable filter is applied according to an embodiment to which the present invention is applied.
Figure 5:
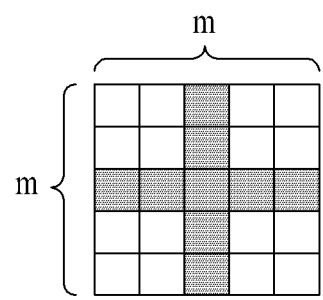

FIGS. 5A and 5B illustrate a first separable filter applied to depth data according to embodiments of the present invention.

Referring to FIGS. 5A and 5B, filtering can be performed using pixels located on a predetermined vertical line and a predetermined horizontal line based on a filter kernel size. For example, filtering can be applied to the pixels corresponding to the horizontal line and vertical line on the basis of the current pixel. Here, a 1-dimensional filter can be applied in the x direction on the basis of the current pixel and then the 1-dimensional filter can be applied to the application result in the y direction. The filter may be applied in the y direction first and then applied in the x direction. When the filter kernel size is 9, the current block can be filtered using the fifth pixel located at the center in the horizontal and vertical directions. The filter shown in FIGS. 5A and 5B has lower complexity since the filter uses a smaller number of pixels than the filter shown in FIGS. 4A and 4B. That is, temporal complexity of the filter shown in FIG. 4A is $O(NSn^d)$ and complexity of the filter shown in FIG. 5A is $O(NSnSd)$. Here, N denotes the total number of pixels corresponding to one image, n denotes the filter kernel size, d represents dimension and O represents a function. The first separable filter shown in FIGS. 5A and 5B has d corresponding to 2.

While FIGS. 5A and 5B show that the first separable filter is applied to a predetermined number of pixels disposed on the horizontal line and a predetermined number of pixels disposed on the vertical line on the basis of the current pixel, filtering may be applied to pixels located in diagonal directions on the basis of the current pixel.

Figure 6A:
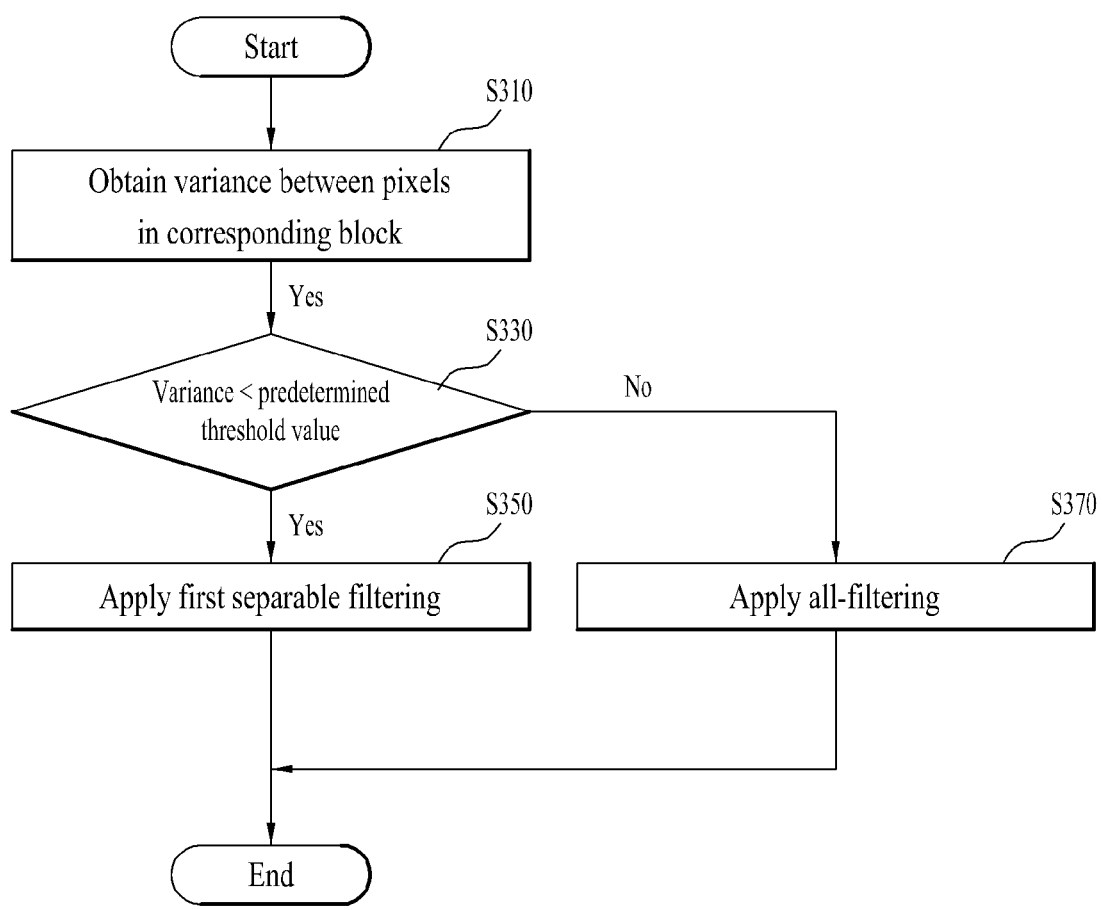

FIG. 6A illustrates a fifth embodiment of the present invention for applying the first separable filter to depth data.

In the embodiment shown in FIG. 6A, the depth block variance can be obtained in the same manner as the first embodiment (S310). That is, the depth block variance is obtained using pixel values in the block including the current pixel (S310) and compares the depth block variance with a predetermined threshold value (S330). When the depth block variance is less than the predetermined threshold value, first separable filtering is applied (S350). When the depth block variance is not less than the predetermined threshold value, all-filtering is applied (S370). First separable filtering may be applied when the depth block variance equals the predetermined threshold value. All-filtering refers to a filtering method of the filter having the predetermined kernel size shown in FIGS. 3A and 3B, performed using all pixels of the corresponding kernel. That is, first separable filtering is performed using only some pixels of the corresponding kernel by the filter having the predetermined kernel size, whereas all-filtering is performed using all pixels of the kernel.

FIG. 6B illustrates a sixth embodiment of the present invention for applying the first separable filter to depth data.

In the embodiment shown in FIG. 6B, the depth block variance can be obtained in the same manner as the first embodiment (S410). That is, the depth block variance is obtained using pixels in the block including the current pixel (S410) and compared with a predetermined first threshold value (S420). When the depth block variance is less than the predetermined first threshold value, filtering is not applied (S440). The depth block variance is compared with a predetermined second threshold value (S430). When the depth block variance is less than the predetermined second threshold value, first separable filtering is applied (S450). When the depth block variance is not less than the predetermined second threshold value, all-filtering is applied (S470).

While the sixth embodiment determines filtering to be applied in the same manner as the fifth embodiment, the sixth embodiment is distinguished from the fifth embodiment in that the depth block variance is additionally compared with the predetermined first threshold value and whether to apply filtering is determined according to the comparison result.

Figure 7:
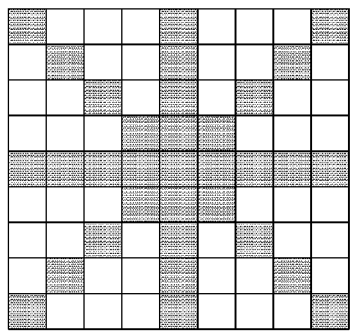
FIGS. 7A and 7B illustrate ranges to which a second separable filter is applied according to an embodiment to which the present invention is applied.
Figure 7:
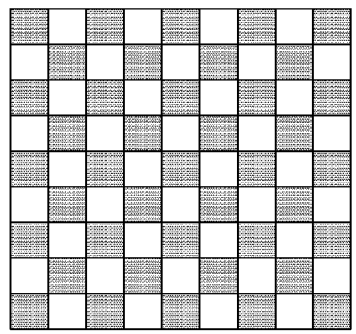
Figure 7:
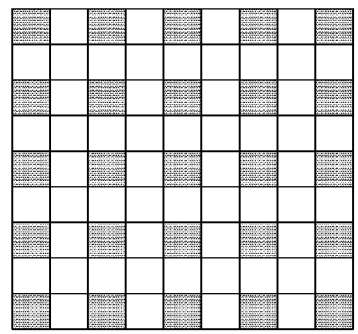

FIGS. 7A, 7B and 7C illustrate second separable filters (modified separable filters) applied to depth data according to embodiments of the present invention.

In FIGS. 7A, 7B and 7C, filtering is applied to dark parts. The number of pixels used by the second separable filters shown in FIGS. 7A, 7B and 7C differs from the number of pixels used by the first separable filter. That is, the number of neighboring pixels used by the second separable filters to filter the current block is greater than the number of neighboring pixels used by the first separable filter. The second separable filter corresponding to FIG. 7A can use pixels located on the horizontal line, vertical line and both diagonal lines on the basis of the current pixel for filtering. This filter can be efficiently applied to an image region including a diagonal edge. In this case, filter complexity is O(NSnS2d). The second separable filter can be applied in such a manner that the filter is applied in the x direction (horizontal line) on the basis of the current pixel and then the filter application result is applied in the y direction (vertical line), in a diagonal direction toward the bottom of the right side from the top of the left side and then in a diagonal direction toward the bottom of the left side from the top of the right side. However, the filter application direction may be changed.

The second separable filter corresponding to FIG. 7B may be applied to only one of two grouped pixels when two neighboring pixels are grouped into one group. For example, the filter can be applied to only pixels corresponding to odd-numbered rows and odd-numbered columns or only pixels corresponding to even-numbered rows and even-numbered columns. The filter may be applied to only pixels corresponding to even-numbered rows and odd-numbered columns or only pixels corresponding to odd-numbered columns and even-numbered rows. The filter corresponding to FIG. 7B has highest complexity from among second separable filters shown in FIGS. 7A, 7B and 7C but has high coding efficiency. The filter complexity corresponds to $$O\left(\frac{NSn^d}{2}\right).$$

The second separable filter corresponding to FIG. 7C may be applied to only one of four grouped pixels when four neighboring pixels are grouped into one group. For example, the filter can be applied to only a pixel at the top of the left in each group of four pixels, that is, only pixels corresponding to odd-numbered rows and odd-numbered columns. The filter may be applied to a pixel at the top right, a pixel at the bottom left or a pixel at the bottom right in each group. The second separable filter corresponding to FIG. 7C may perform efficient coding when data is dispersed in an image region. The filter complexity corresponds to $$O\left(\frac{NSn^d}{4}\right).$$

Figure 8A:
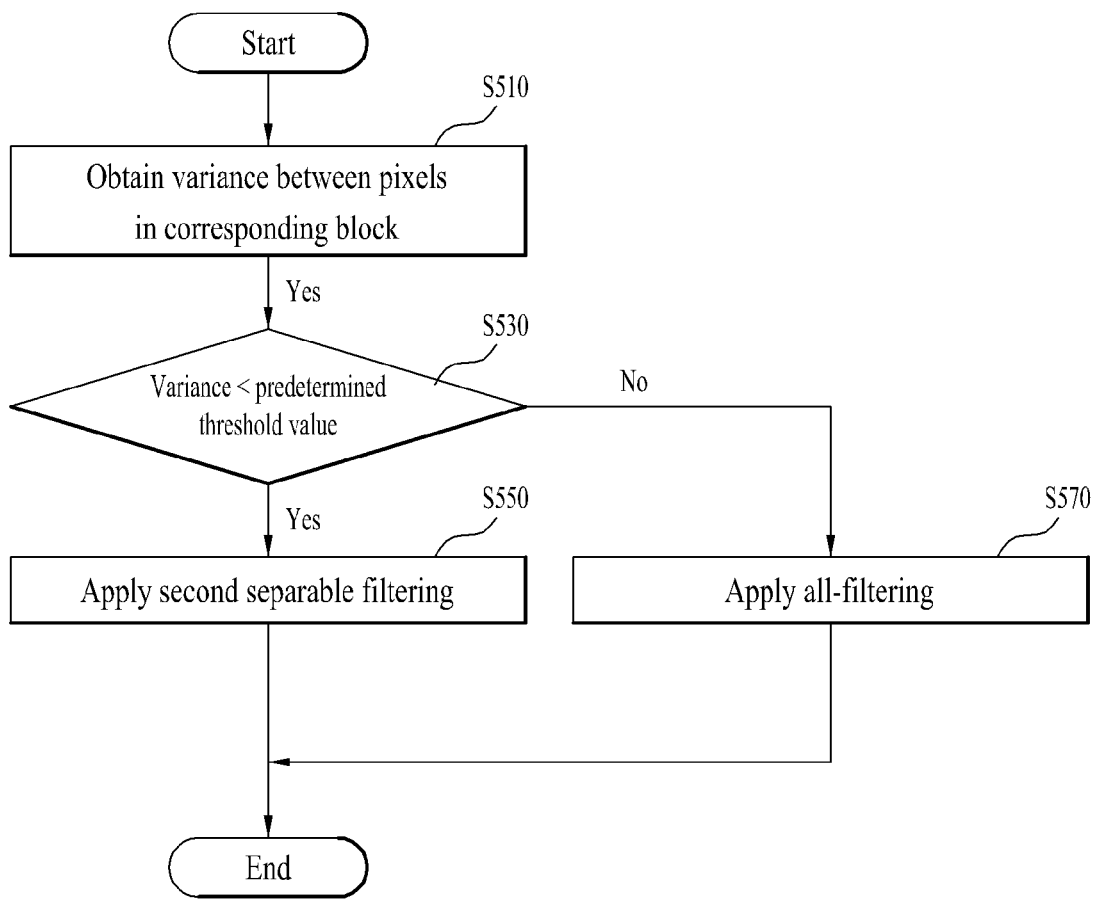

FIG. 8A illustrates a seventh embodiment of the present invention for applying the second separable filter to depth data.

In the embodiment shown in FIG. 8A, the depth block variance can be obtained through the same method as that described in the first embodiment (S510). Specifically, the depth block variance is obtained using pixel values in the block including the current pixel (S510) and compared with a predetermined threshold value (S530). When the depth block variance is less than the predetermined threshold value, second separable filtering is applied (S550). When the depth block variance is not less than the predetermined threshold value, all-filtering is applied (S570). While all-filtering is applied when the depth block variance equals the predetermined threshold value in the present embodiment, second separable filtering may be applied when the depth block variance equals the predetermined threshold value.

FIG. 8B illustrates an eight embodiment of the present invention for applying the second separable filter to depth data.

In the embodiment shown in FIG. 8B, the depth block variance can be obtained through the same method as that described in the first embodiment (S610). That is, the depth block variance is obtained using pixel values in the block including the current pixel (S610) and compared with a predetermined first threshold value (S620). When the depth block variance is less than the predetermined first threshold value, filtering is not applied (S640). The depth block variance is compared with a predetermined threshold value (S630). When the depth block variance is less than the predetermined second threshold value, second separable filtering is applied (S650). When the depth block variance is not less than the predetermined second threshold value, all-filtering is applied (S670).

While the eighth embodiment determines filtering to be applied in the same manner as the seventh embodiment, the eighth embodiment differs from the seventh embodiment in that the former additionally compares the depth block variance with the predetermined first threshold and determines whether to apply filtering according to the comparison result.

Figure 9:
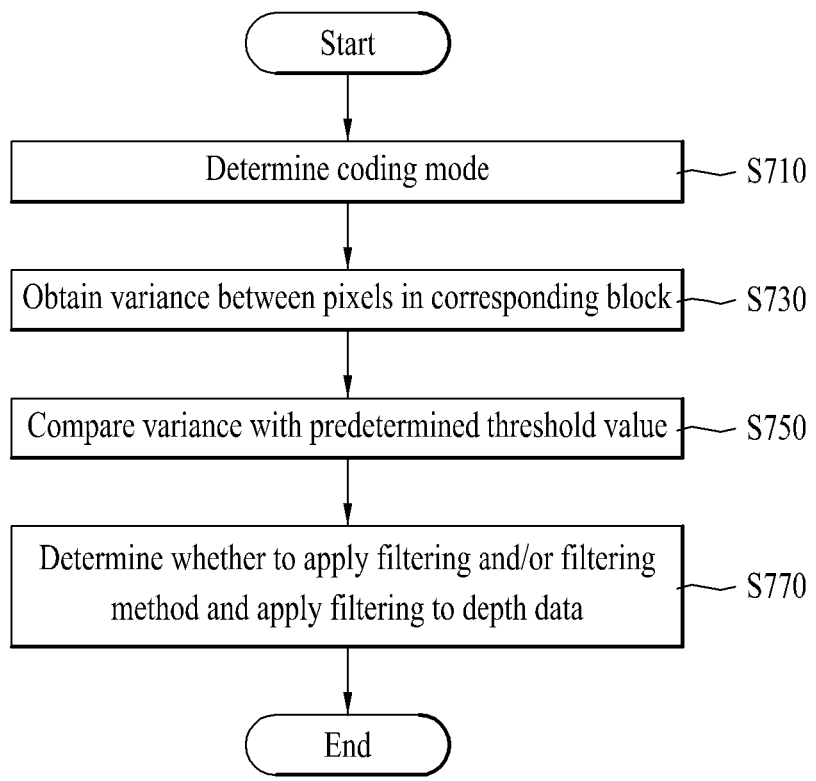
FIG. 9 is a flowchart illustrating a method for determining a filtering application method using a coding mode according to an embodiment to which the present invention is applied.

FIG. 9 illustrates a ninth embodiment of the present invention for applying a filter to depth data on the basis of a coding mode.

In the ninth embodiment, which one of the filters described in the aforementioned third to eighth embodiments will be used may be determined on the basis of a coding mode and depth data may be filtered on the basis of the determined filter. Specifically, the in-loop filtering unit 500 determines a coding mode for coding depth data (S710) and obtains a depth block variance using pixel values in the depth block including the current pixel (S730). In addition, the in-loop filtering unit 500 compares the depth block variance with a predetermined threshold value (S750) and determines whether to filter the depth data and/or a filtering scheme on the basis of the comparison result and the coding mode (S770).

The coding mode may be determined in the encoding unit and transmitted to the decoding unit. Otherwise, the coding mode may be obtained while the decoding unit codes depth data of the corresponding block.

Table 1 shows a filtering method applicable per coding mode when one threshold value is set. A larger kernel size may be set when the depth block variance is greater than the threshold value than when the depth block variance is less than the threshold value, which is not shown in the table. For example, the depth block variance is compared with the predetermined threshold value (S750), first separable filtering is applied to depth data when the depth block variance is greater than the threshold value and the coding mode corresponds to a first coding mode, and the depth data to which first separable filtering has been applied is output to the decoded picture buffer unit 600.

When the depth block variance is large, complexity can be reduced by using the first separable filter. However, characteristics such as edges cannot be well preserved. To solve this problem, the second separable filter can be applied in the case of a large depth block variation and the first separable filter can be applied in the case of a small depth block variation.

The aforementioned first separable filter, second separable filter and all-filter are preferably filters using a bilateral filter. In other words, the all-filter may correspond to a bilateral filter and the first and second separable filters may correspond to filters that apply a bilateral filter to part of data. However, the present invention can code depth data using a median filter as well as the bilateral filter and use any filter that can be applied to the in-loop filtering unit 500.

As described above, the depth data filtered through the in-loop filtering unit 500 may be input to the inter prediction

TABLE 1

| Coding mode | When variance is greater than the predetermined threshold value | When variance is less than the predetermined threshold value |
| --- | --- | --- |
| First coding mode | First separable filtering | No filtering |
| Second coding mode | First separable filtering | First separable filtering |
| Third coding mode | Second separable filtering | No filtering |
| Fourth coding mode | Second separable filtering | First separable filtering |
| Fifth coding mode | Second separable filtering | Second separable filtering |
| Sixth coding mode | All-filtering | First separable filtering |
| Seventh coding mode | All-filtering | Second separable filtering |

Table 2 shows a filtering method applicable per coding mode when two threshold values are set. A larger kernel size may be set when the depth block variance is greater than the predetermined first or second threshold value than when the depth block variance is less than the first or second threshold value, which is not shown in the table. For example, a kernel size of a filter applied to second separable filtering when the variance is greater than the second threshold value can be set to a value greater than a kernel size applied when the variance is less than the second threshold value and greater than the first threshold value in a second coding mode.

unit 700 via the decoded picture buffer unit 600 shown in FIG. 2. Here, the depth data may be used to derive a disparity vector.

Specifically, position information of a corresponding block of a depth picture can be obtained from position information of a target block of a text picture. Here, the position of the corresponding block of the depth picture can be determined as a block at the same position as the target block of the texture picture. However, spatial resolutions of the texture picture and the depth picture may be coded differently because coding efficiency may not be remarkably

TABLE 2

| Coding mode | When variance is greater than the predetermined second threshold value | When variance is greater than the first threshold value and less than the second threshold value | When variance is less than the first threshold value |
| --- | --- | --- | --- |
| First coding mode | Second separable filtering | First separable filtering | No filtering |
| Second coding mode | Second separable filtering | Second separable filtering | First separable filtering |
| Third coding mode | Second separable filtering | Second separable filtering | No filtering |
| Fourth coding mode | Second separable filtering | First separable filtering | First separable filtering |
| Fifth coding mode | First separable filtering | First separable filtering | No filtering |
| Sixth coding mode | All-filtering | Second separable filtering | First separable filtering |
| Seventh coding mode | All-filtering | Second separable filtering | Second separable filtering |
| Eighth coding mode | All-filtering | First separable filtering | First separable filtering | decreased even when depth information is coded in reduced spatial resolution owing to characteristics of the depth information that represents a distance between a camera and an object. For example, when spatial resolution of the depth picture is coded lower than the texture picture, a decoder can upsample the depth picture prior to acquisition of the position information of the corresponding block of the depth picture. In addition, when aspect ratios of the upsampled depth picture and the texture picture do not correctly correspond to each other, offset information may be additionally considered in acquisition of the position information of the corresponding block in the upsampled depth picture. For example, the offset information can include top offset information, left offset information, right offset information and bottom offset information. The top offset information may represent a position difference between at least one pixel located at the top of the upsampled depth picture and at least one pixel located at the top of the texture picture. The left offset information, right offset information and bottom offset information can be defined in the same manner.

Upon acquisition of the position information of the corresponding block of the depth picture from the position information of the target block of the text picture, depth data corresponding to the position information of the corresponding block of the depth picture can be obtained. When a plurality of pixels is present in the corresponding block, depth data corresponding to a corner pixel of the corresponding block or depth data corresponding to a center pixel of the corresponding block may be used. Otherwise, a maximum value, a minimum value and a most frequent value from among depth data corresponding to a plurality of pixels may be selectively used or the average value of the depth data may be used.

A disparity vector of the target block may be derived using the obtained depth data and camera parameters. A detailed method for deriving the disparity vector will now be described based on Equations 6 and 7.

$$Z = \frac{1}{\frac{D}{255} S \left( \frac{1}{Z_{near}} - \frac{1}{Z_{far}} \right) + \frac{1}{Z_{far}}}$$ [Equation 6]

In Equation 6, Z denotes a distance between a corresponding pixel and a camera and D denotes the quantized value of Z and corresponds to depth data according to the present invention. In addition, $Z_{near}$ and $Z_{far}$ respectively represent a minimum value and a maximum value of Z, defined for a viewpoint corresponding to the depth picture. $Z_{near}$ and $Z_{far}$ may be extracted from a bitstream through a sequence parameter set, a slicer header or the like and may be information predetermined in the decoder. Accordingly, when the distance Z between the corresponding pixel and the camera is quantized into 256 levels, Z can be reconstituted using depth data, $Z_{near}$ and $Z_{far}$ as represented by Equation 6. Then, the disparity vector for the target block can be derived using the reconstituted Z, as represented by Equation 7

$$d = \frac{fSB}{Z}$$ [Equation 7]

In Equation 7, f denotes a focal distance of a camera and B denotes a distance between cameras. It can be assumed that all cameras have the same f and B, and thus f and B may be information predefined in the decoder.

The obtained disparity vector may be set as a motion vector of the target block. Otherwise, the disparity vector may be used as a predicted motion vector of the target block.

As described above, the decoding/encoding apparatus to which the present invention is applied may be included in a multimedia broadcast transmitting/receiving system such as a DMB (Digital Multimedia Broadcasting) system and used to decode a video signal, a data signal and the like. In addition, the multimedia broadcast transmitting/receiving system may include a mobile communication terminal.

The decoding/encoding method to which the present invention is applied can be implemented as a program to be executed in a computer and stored in a computer readable recording medium and multimedia data having a data structure according to the present invention can be stored in the computer readable recording medium. The computer readable recording medium includes all types of storage devices storing data readable by a computer system. Examples of the computer readable recording medium include ROM, RAM, CD-ROM, magnetic tapes, floppy disks, optical data storage devices, etc. and also include implementation in the form of carrier wave (e.g. transmission over the Internet). Furthermore, a bitstream generated by the encoding method can be stored in the computer readable recording medium or transmitted through a wired/wireless communication network.

INDUSTRIAL APPLICABILITY

The present invention can be used to code a video signal.
[Drawings]
FIG. 2
100 NAL parsing unit
200 Entropy decoding unit
300 Dequantization/inverse transform unit
400 Intra prediction unit
500 In-loop filtering unit
600 Decoded picture buffer unit
700 Inter prediction unit
FIG. 4a
Start
S110 Obtain variance between pixels in corresponding block
S130 Variance<predetermined threshold value
S150 Apply filtering with m*m kernel size
S170 Apply filtering with n*n kernel size
End
FIG. 4b
Start
S210 Obtain variance between pixels in corresponding block
S220 Variance<predetermined first threshold value
S230 Variance<predetermined second threshold value
S240 Determine no filtering
S250 Apply filtering with m*m kernel size
S270 Apply filtering with n*n kernel size
End
FIG. 6a
Start
S310 Obtain variance between pixels in corresponding block
S330 Variance<predetermined threshold value
S350 Apply first separable filtering
S370 Apply all-filtering
End
FIG. 6b
Start
S410 Obtain variance between pixels in corresponding block
S420 Variance<predetermined first threshold value S430 Variance<predetermined second threshold value
S440 Determine no filtering
S450 Apply first separable filtering
S470 Apply all-filtering
End
FIG. 8a
Start
S510 Obtain variance between pixels in corresponding block
S530 Variance<predetermined threshold value
S550 Apply second separable filtering
S570 Apply all-filtering
End
FIG. 8b
Start
S610 Obtain variance between pixels in corresponding block
S620 Variance<predetermined first threshold value
S630 Variance<predetermined second threshold value
S640 Determine no filtering
S650 Apply second separable filtering
S670 Apply all-filtering
End
FIG. 9
Start
S710 Determine coding mode
S730 Obtain variance between pixels in corresponding block
S750 Compare variance with predetermined threshold value
S770 Determine whether to apply filtering and/or filtering method and apply filtering to depth data
End

The invention claimed is:

1. A method for processing a video signal by a video apparatus, comprising:
receiving, by the video apparatus, depth data corresponding to a current depth block including a current depth pixel;
determining, by the video apparatus, a variance of the depth data by subtracting a maximum depth pixel from a minimum depth pixel in the current depth block;
selecting, by the video apparatus, one of a first separable filter and a second separable filter by comparing, by the video apparatus, the variance of the depth data with a predetermined value;
coding, by the video apparatus, the current depth pixel using the selected first separable filter when the variance is less than the predetermined value; and
coding, by the video apparatus, the current depth pixel using the selected second separable filter when the variance is greater than the predetermined value,
wherein the number of depth pixels applied by the second separable filter is larger than the number of depth pixels applied by the first separable filter,
wherein the first separable filter is applied to only the depth pixels located on (2M−1, 2M−1) in the current depth block (M is a natural number less than N, 2N is a width and height of a kernel size), and
wherein the second separable filter is applied to the depth pixels located on (2M−1, 2M−1) and (2M, 2M) in the current depth block.

2. The method according to claim 1, wherein a kernel size of the second separable filter is larger than a kernel size of the first separable filter.

3. The method according to claim 1, wherein the first separable filter and the second separable filter correspond to a separable bilateral filter.

4. An apparatus for processing a video signal, comprising:
a receiver, coupled to an in-loop filtering unit, that:
receives depth data corresponding to a current depth block including a current depth pixel,
the in-loop filtering unit, including a first separable filter and a second separable filter, that:
determines a variance of the depth data by subtracting a maximum depth pixel from a minimum depth pixel in the current depth block;
selecting one of the first separable filter and the second separable filter by comparing the variance of the depth data with a predetermined value;
codes the current depth pixel using the first separable filter when the variance is less than the predetermined value; and
codes the current depth pixel using the second separable filter when the variance is greater than the predetermined value,
wherein the number of depth pixels applied by the second separable filter is larger than the number of depth pixels applied by the first separable filter,
wherein the first separable filter is applied to only the depth pixels located on (2M−1, 2M−1) in the current depth block (M is a natural number less than N, 2N is a width and height of a kernel size), and
wherein the second separable filter is applied to the depth pixels located on (2M−1, 2M−1) and (2M, 2M) in the current depth block.

5. The apparatus of claim 4, wherein a kernel size of the second separable filter is larger than a kernel size of the first separable filter.

6. The apparatus of claim 4, wherein the first separable filter and the second separable filter correspond to a separable bilateral filter.

* * * * *